United States Patent
Parker et al.

(10) Patent No.: US 11,218,329 B2
(45) Date of Patent: Jan. 4, 2022

(54) CERTIFICATE GENERATION WITH FALLBACK CERTIFICATES

(71) Applicant: ARRIS Enterprises, LLC, Suwanee, GA (US)

(72) Inventors: Silas Parker, West Yorkshire (GB); Philip B. Hawthorne, Craigavon (GB)

(73) Assignee: ARRIS Enterprises LLC, Suwanee, GA (US)

( * ) Notice: Subject to any disclaimer, the term of this patent is extended or adjusted under 35 U.S.C. 154(b) by 137 days.

(21) Appl. No.: 16/795,290

(22) Filed: Feb. 19, 2020

(65) Prior Publication Data

US 2020/0267005 A1    Aug. 20, 2020

Related U.S. Application Data

(60) Provisional application No. 62/808,256, filed on Feb. 20, 2019.

(51) Int. Cl.
*H04L 29/06* (2006.01)
*H04L 9/32* (2006.01)
*H04L 9/08* (2006.01)

(52) U.S. Cl.
CPC .......... *H04L 9/3268* (2013.01); *H04L 9/0825* (2013.01)

(58) Field of Classification Search
CPC ... H04L 9/3268; H04L 9/0825; H04L 9/3247; H04L 9/0891
See application file for complete search history.

(56) References Cited

U.S. PATENT DOCUMENTS

| | | | | |
|---|---|---|---|---|
| 9,043,456 | B2* | 5/2015 | Kuramoto | G06F 16/284 709/224 |
| 2004/0093493 | A1* | 5/2004 | Bisbee | G07F 7/08 713/156 |
| 2011/0197061 | A1 | 8/2011 | Chou et al. | |
| 2015/0222604 | A1* | 8/2015 | Ylonen | H04L 9/083 713/171 |
| 2015/0256345 | A1 | 9/2015 | Vaid et al. | |
| 2015/0341342 | A1* | 11/2015 | Klieman | H04L 9/32 713/158 |
| 2016/0063466 | A1 | 3/2016 | Sheridan et al. | |
| 2017/0054565 | A1 | 2/2017 | Feng et al. | |
| 2017/0070484 | A1* | 3/2017 | Kruse | H04L 63/0442 |

(Continued)

OTHER PUBLICATIONS

International Search Report and Written Opinion Re: Application No. PCT/US2020/0018986.

*Primary Examiner* — Sher A Khan
(74) *Attorney, Agent, or Firm* — Chernoff Vilhauer LLC

(57) ABSTRACT

A system and method for of providing secure communication between a client device having a non-volatile read only memory and a first server is disclosed. One embodiment is evidenced by a method that comprises determining if a generation of a certificate is complete, the certificate generated in the client device and having a public key generated from a private key, providing the generated certificate to the first server to authenticate the client device if the generation of the certificate is complete, and retrieving a fallback certificate from the non-volatile read only memory and providing the fallback certificate to the first server to ephemerally authenticate the client device until the generated certificate is provided to the first server if the generation of the certificate is not complete.

20 Claims, 6 Drawing Sheets

---

202 — Determine if a generation of a certificate is complete, the certificate generated in the client device and having a public key generated from a private key 204 — Provide the generated certificate to the first server to authenticate the client device if the generation of the certificate is complete 206 — Retrieve a fallback certificate from the non-volatile read only memory and providing the fallback certificate to the first server to ephemerally authenticate the client device until the generated certificate is provided to the first server if the generation of the certificate is not complete.

(56) References Cited

U.S. PATENT DOCUMENTS

2017/0250827 A1* 8/2017 Opschroef ............ H04L 9/0891
2017/0288880 A1* 10/2017 Brockhaus ............ H04L 9/0891
2018/0034644 A1* 2/2018 Komiya ................ H04L 9/0825
2018/0109516 A1 4/2018 Song et al.

* cited by examiner

CERTIFICATE GENERATION WITH FALLBACK CERTIFICATES

CROSS-REFERENCE TO RELATED APPLICATIONS

This application claims benefit of U.S. Provisional Patent Application No. 62/808,256, entitled "CERTIFICATE GENERATION WITH FALL BACK CERTIFICATES," by Silas Parker and Philip B. Hawthorne, filed Feb. 20, 2019, which application is hereby incorporated by reference herein.

BACKGROUND

1. Field

The present disclosure relates to systems and methods for disseminating content, and in particular to a system and method for providing secure communications to client devices.

2. Description of the Related Art

Consumer electronic devices such as set top boxes (STBs) process and present content such as media programs to consumers. Such media programs are typically encrypted so that they can only be decrypted only by authorized STBs. In many paradigms, this is accomplished by providing a licensing information, which may include content decryption keys, to the STBs. To obtain such information, the STBs typically must occasionally communicate with a licensing (or similar) server. Since such communications must be secure, they often employ public key cryptography (asymmetric cryptography) to establish a secure connection, wherein client device can verify it is securely connected to the server, and the server can verify it is connected to a valid STB. To allow the server to verify the client is valid, the STB are typically manufactured to include at the a certificate with a public key and a private key pair, such that the client certificate and public key can be presented to the server to be verified, and the matching private key allows the client to correctly cipher the data. To avoid a compromised certificate being used, certificates contain an expiry time, after which time, the certificate will be rejected, even if the signature is valid.

Public key cryptography allows a chain of certificates to be created, whereby a certificate and public key can be signed by another certificate and public key. This allows the other party to verify that a certificate is valid because it can verify the signature is valid, even though it did not generate the original certificate. Generating public/private key pairs is a computationally expensive operation which may take several minutes.

During consumer electronic device manufacturing, the same firmware image is placed on the device's non-volatile read-only storage which cannot be modified by the running software. This means all devices will contain the same certificates, public keys and private keys at the time they are manufactured.

Each device contains the same firmware, but to avoid the private keys being easily compromised, it would be preferable for each device to use a unique certificate and public/private key pair when authenticating to the server. To do this the device could generate a certificate and public/private key pair when it was initially started, but doing this would postpone making the connection for significant period of time after start up whilst the key pair is generated. As certificates may also have an expiry time, if the certificate expires while the device is turned off, the certificate would have to be generated during start up again.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for of providing secure communication between a client device having a non-volatile read only memory and a first server. In one embodiment, the method comprises determining if a generation of a certificate is complete, the certificate generated in the client device and having a public key generated from a private key, providing the generated certificate to the first server to authenticate the client device if the generation of the certificate is complete, and retrieving a fallback certificate from the non-volatile read only memory and providing the fallback certificate to the first server to ephemerally authenticate the client device until the generated certificate is provided to the first server if the generation of the certificate is not complete.

Another embodiment is evidenced by an apparatus having a processor and a communicatively coupled memory storing processor instructions for performing the foregoing operations.

The features, functions, and advantages that have been discussed can be achieved independendy in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

The device will contain a fallback certificate provided in the firmware for use with the initial connection. The device will then generate the unique ephemeral certificate & key pair once started in the background for use on subsequent connections.

When implemented by client device software, this technique allows the connection to occur without delay during startup. For example, an 800 MHz ARMv6 core can typically generate a 4096 bit private key in just over a minute. This delay is avoided during startup and the process can happen in the background once the CPU of the client device is idle. Previous solutions would delay the startup of the client device software while waiting for the certificate and keys to be generated.

Data Distribution System

Figure 1:
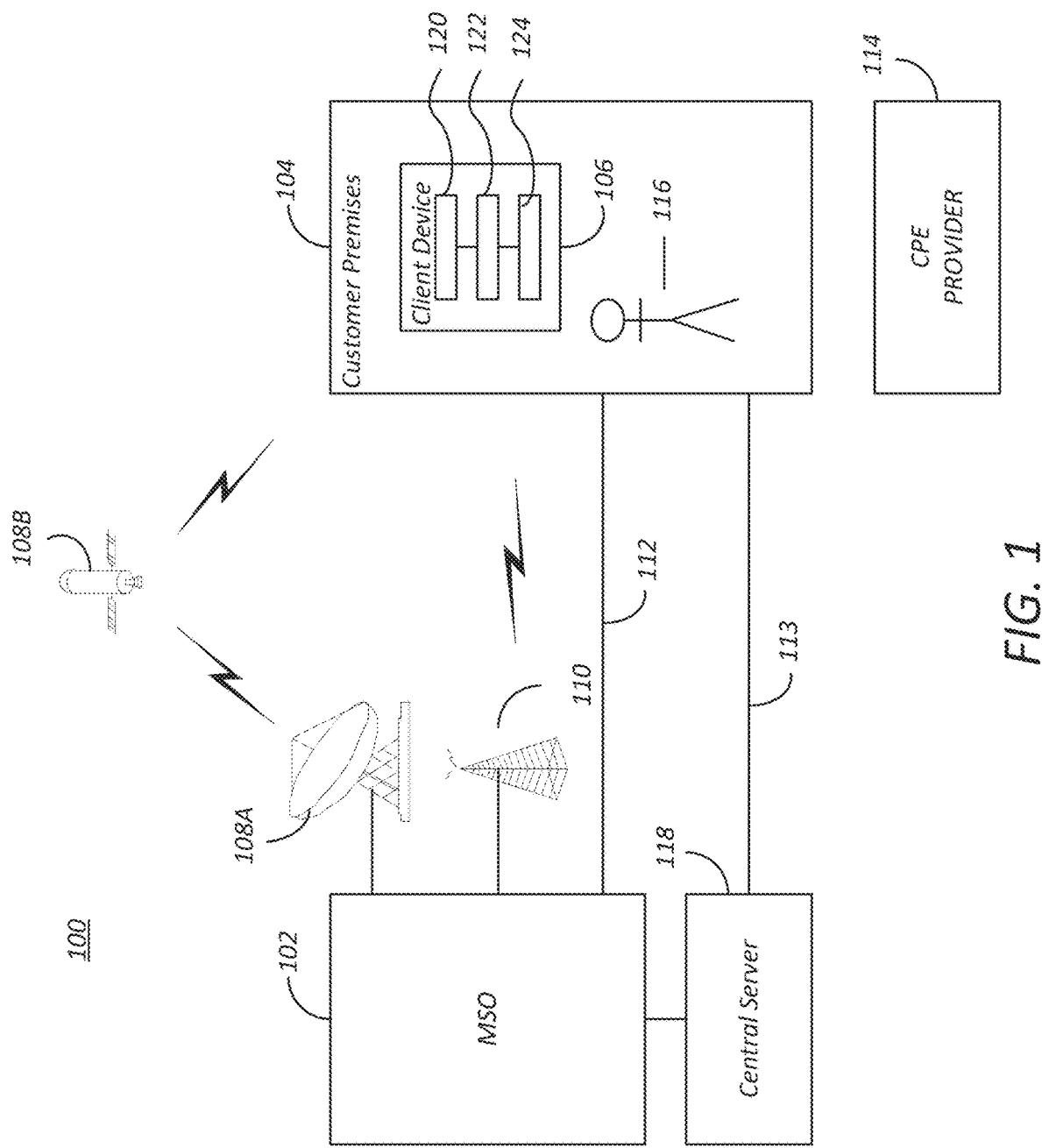
FIG. 1 is a diagram of an exemplary data distribution system.

FIG. 1 is a diagram of an exemplary data distribution system 100. The data distribution system 100 comprises a multi system operator (MSO) 102 that transmits information to a plurality of users 116. Each such user 116 is provided a client device 106 installation where the data services are to be received. Exemplary client devices 106 include set top boxes (STBs), cable modems, smart phones, tablet computers, desktop computers, laptop computers, or any device capable of receiving and presenting content for consumption by users 116. Client devices 106 are alternatively referred to as customer provided equipment (CPEs) in the following disclosure.

The client device 106 includes the processor 122 communicatively coupled to a typically volatile and random access memory 120 and a non-volatile read only memory 124. Typically, the client device 106 is installed in the customer premises 104 such as a home, but the client device 106 may be installed in motor vehicle or be carried on the user's person. In many instances, the client devices 106 provided to the users 116 are manufactured (at least in part) by a client device provider 114. In some embodiments, the client device provider 114 manufactures client devices 106 of one hardware design that can be used with different MSOs 102, each having different functional requirements. Typically, this is accomplished through modification of the software and/or firmware of the client device 106. The client device provider 114 may also manufacture client devices 106 with different hardware functionality for different MSOs 102. Typically, the data transmitted between the MSOs 102 and the client devices 106 is encrypted or otherwise obfuscate it to protect it from being received by unauthorized entities. Consequently, client devices 106 typically include a conditional access system (CAS) that decrypts the data transmitted by the MSO 102 and may also have the capability to encrypt data transmitted from the client device 106 to the MSO 102.

The MSO 102 may transmit data via a wired connection 112 such as optical cable or conductive wire. The MSO may also transmit data via a wireless connection such as via a terrestrial transmitter 110 or a satellite broadcast system in which data is transmitted via a ground station 108A and a satellite 108B.

In some cases, the data distribution system 100 also permits the users' client device 106 to transmit information to the MSO 102 or a central server 118, such as a licensing server. Accordingly, the data distribution permits information to be transceived (e.g. transmitted and received) by the MSO 102 and central server 118, and the client device 106. Further, such systems may be asymmetric, with data being transmitted from the MSO 102 to the client device 106 via one transmission method, and data being transmitted from the client device 106 to the MSO 102 or central server 118 by another transmission method. For example, it is known for MSOs 102 to transmit media programs to subscribers having client device 106 via satellite, but data to be transmitted from the client device 106 to the MSO 102 were central server 118 be transmitted via a wired connection such as 112. For example, the client device 106 may require updated encryption keys on an occasional basis. In such instances, the client device 106 establishes a secure communication channel with the central server via communication link 113 to obtain a license having such encryption keys, or a means of generating them. As a part of this secure communications channel, the client device 106 and the central server 118 authenticate one another, to verify that each entity is what they claim to be. This is typically accomplished by the exchange of digital certificates signed either by a certificate authority (CA) or in intermediate entity. Accordingly, the client device 106 is typically provisioned with a digital certificate for this purpose. For security purposes, such digital certificates expire after passage of time, and a new certificate must be generated. Such generation requires generating a random private key, generating a public key from that private key, and then generating a digital certificate that includes, among other things, the public key. However, as described above, this generation of the digital certificate is computationally intensive and can take a significant amount of time, thus delaying the reactivation of the client device 106.

Certificate Generation

The foregoing issue can be solved by including, within the firmware, a master certificate and key pair which can be used for signing new certificates and key pairs, and a fallback certificate and key pair. During the initial start-up, or at subsequent start-ups, if the certificate generated by the client device 106 (hereinafter, the generated certificate) has expired while the client device 106 is turned off, the client device 106 will connect using a "fallback certificate" to allow a fast connection, and use of the client device 106 while the certificate is being generated. Once the client device has fully started and the processor 122 isn't busy (a processing lull), a new certificate and key pair can be generated as a low priority background task. At a convenient point, the client device 106 can disconnect from the central server 118 and reconnect to the central server 118 using the generated certificate. The generated certificate can be stored in the client device software writeable non-volatile storage 124 for use on subsequent start-ups, until another new digital certificate must be generated.

In one embodiment, the generated certificate is configured with a short expiry time (to prevent long term usage in the event of a compromise). In such circumstances, the client device 106 generates the certificate and then reconnects to the central server 118 before the expiry time of the current certificate to avoid having to wait for certificate generation process within the client device 106 or unnecessary use of the fallback certificate.

Figure 2:
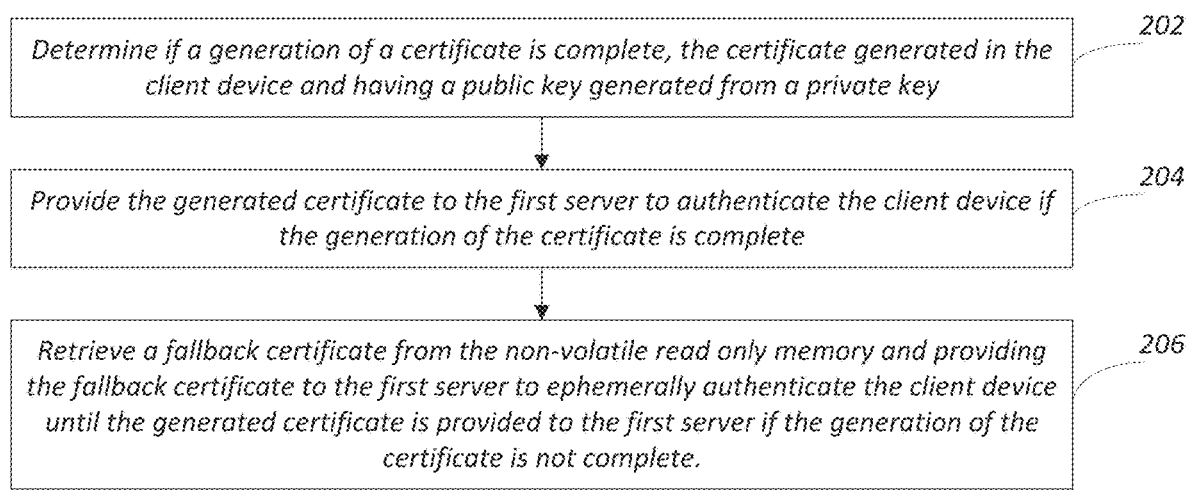
FIG. 2 is a diagram illustrating top-level exemplary process steps that can be used to provide secure communication between the client device and the server.

FIG. 2 is a diagram illustrating top-level exemplary process steps that can be used to provide secure communication between the client device 106 and the server 118. Block 202 determines if the generation of a digital certificate by the client device 106 is complete. The certificate is generated by the client device 106 by generating a private key, a public key from the private key, and the digital certificate from the public key. Such generation of the digital certificate maybe "complete" because the process was temporally far enough in advance of the time and date that the current digital certificate was to expire, or because the current digital certificate had expired, and the process of generating a new digital certificate (while the fall back certificate is being used) has completed. This is described in greater detail in FIG. 3, and the text appurtenant thereto.

If the generation of the certificate is complete, block 204 provides the generated certificate to the server 118 so that the client device 106 can be authenticated and secure communications established. If the generation of the digital certificate is not complete, block 206 retrieves a fallback certificate from the non-volatile read only memory 124 of the client device 106, and provides that fallback certificate to the server 118 to ephemerally authenticate the client device 106 until the generated certificate is provided to the server 118. As described further below, the fallback certificate is digitally signed according to a master certificate also stored in the non-volatile read only memory 124 of the client device 106. The master certificate is signed by a root certificate, which may be obtained from the client device provider 114 or a certificate authority.

Figure 3:
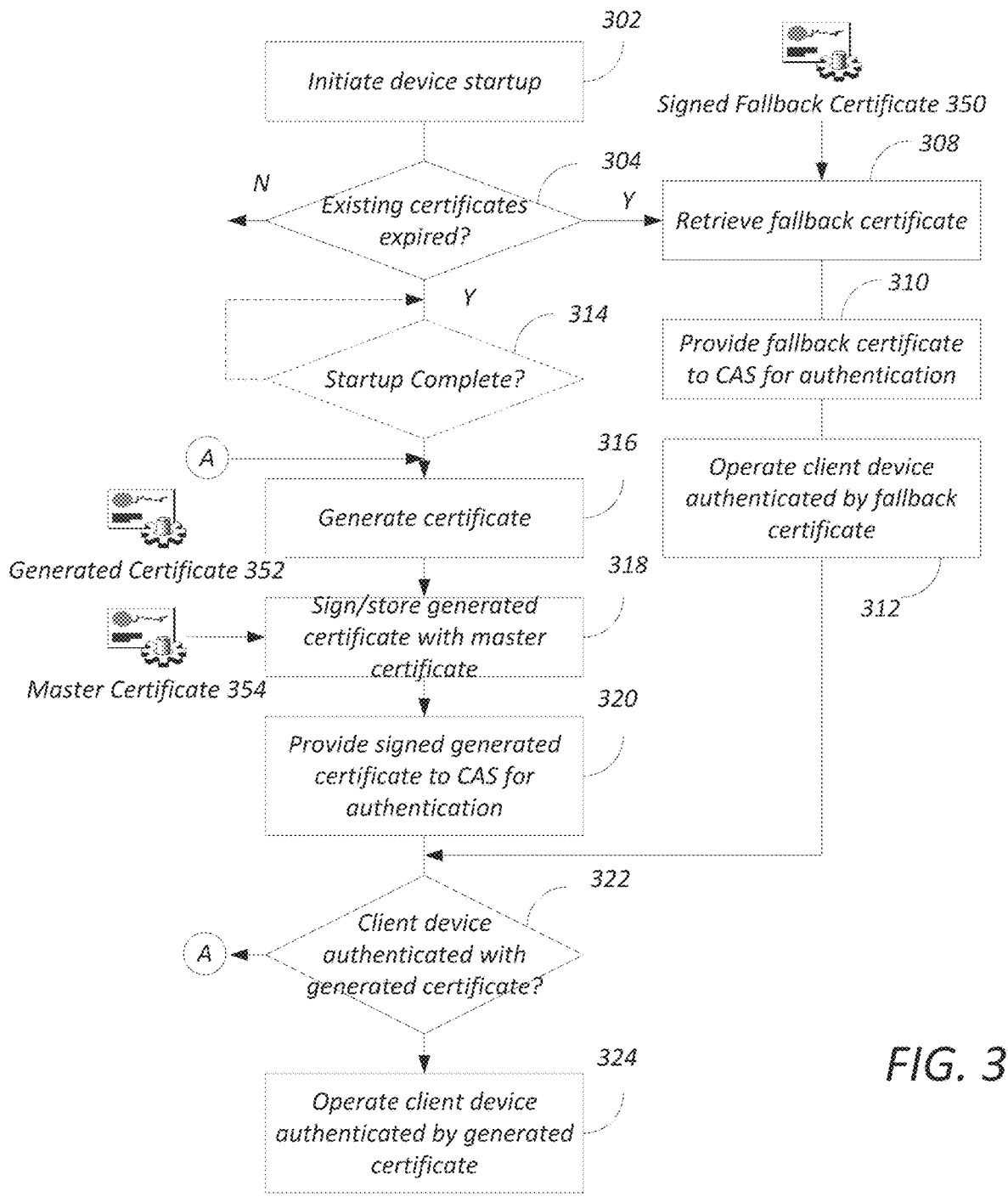
FIG. 3 is a diagram illustrating further details regarding the exemplary process steps illustrated in FIG. 2.

FIG. 3 is a diagram illustrating further details regarding the exemplary process steps illustrated in FIG. 2. In block 302, the client device 106 is activated, and initial device startup is commenced. Upon activation, decision block 304 determines whether the existing digital certificate currently used to authenticate the client device 106 to the server 118 has expired. If such existing certificates have not expired and are not scheduled to expire before they can be regenerated, the client device 106 starts up, and the existing (still valid) digital certificate is used to authenticate the client device 106 to the server 118. If the current digital certificate has not expired, but is expected to expire within a given selectable period of time (typically, within a time period less than that which is required to generate a new digital certificate 352), processing is routed to blocks 316 and 318, which generate a new digital certificate 352 and sign the newly generated digital certificate with a master certificate 354 also stored in the non-volatile read only memory 124 of the client device 106.

However, if the existing certificate has expired, the latest certificate stored by the client device 106 cannot be used to authenticate the client device 106 to the central server 118. So that the client device 106 can be used while the new certificate 352 is generated, a fallback certificate 350, also signed by the master certificate 354 is retrieved from the non-volatile read only memory 124 of the client device 106, as directed by decision block 304 and block 308. In block 310, this fallback certificate is provided to the central server 118 for authentication. Block 312 then operates the client device 106, as authenticated by the fallback certificate 350. While the operations of blocks 308-312 are being performed, the decision block 304 also routes processing to block 316, which generates a new digital certificate 352 in the memory 120 of the client device 106. Block 318 then signs the generated digital certificate 352 with the master certificate 354 stored in the non-volatile read only memory 124 of the client device 106. As shown by optional decision block 314, this process may commence only after the start-up process up the client device 106 is completed. Alternately, decision block 304 can direct a new digital certificate to be generated after determining that the client device 106 is not busy performing other operations.

In block 320 the signed generated certificate 352, is provided to the central server 118 for authentication. Block 322 determines whether the client device 114 has in fact been authenticated to the central server 118. If not, a new digital certificate 352 is generated by returning processing to block 316. While the certificate 352 is being generated, the client device 106 remains authenticated to the central server 118 using the previously provided fallback certificate 350. Finally, in block 324, the client device 10, as authenticated with the generated certificate 352, is operated.

Figure 4A:
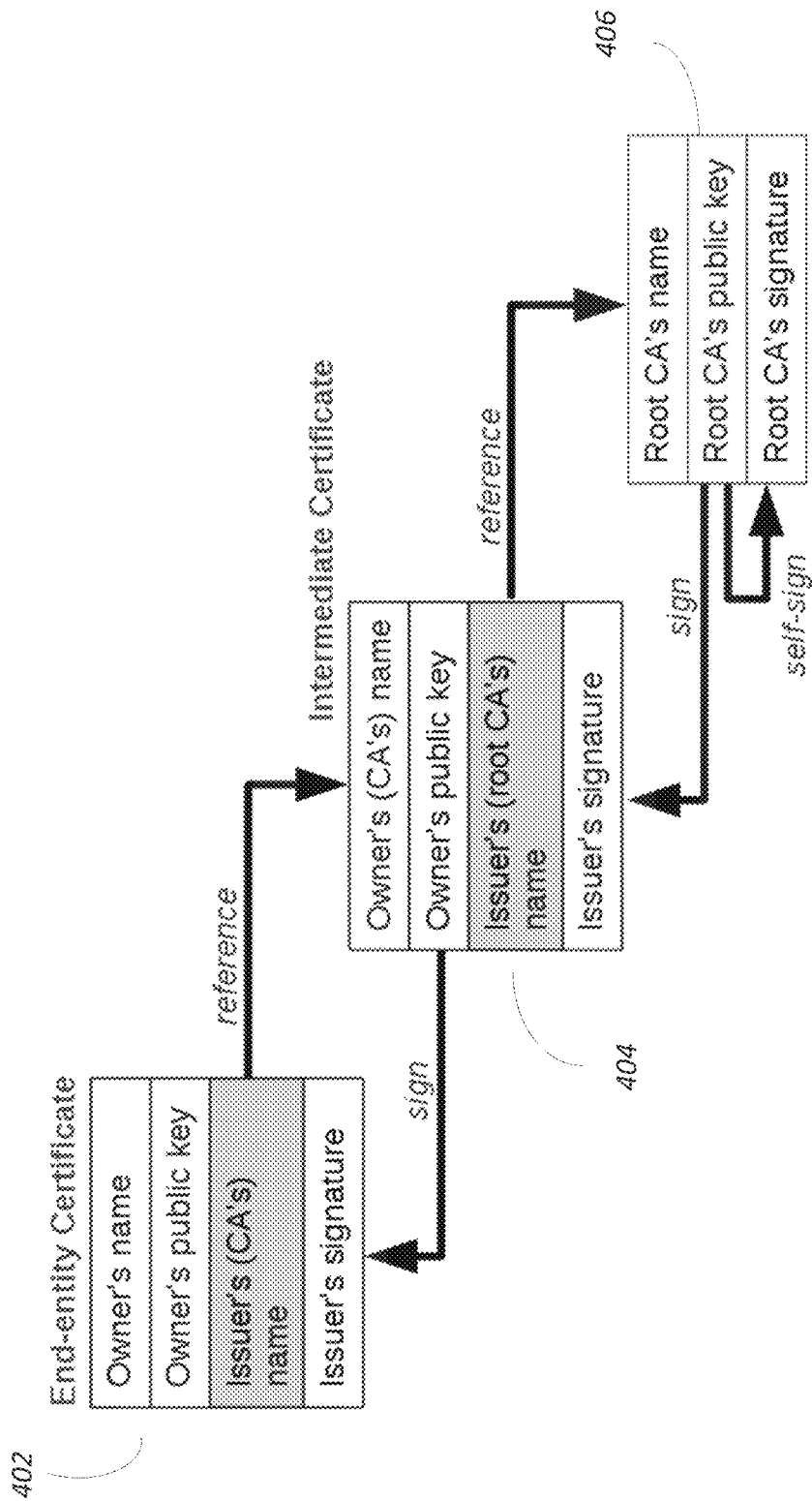
FIG. 4A is a diagram illustrating an exemplary certificate chain.

FIG. 4A is a diagram illustrating an exemplary certificate chain 400. A certificate chain 400 is an ordered list of certificates (402-406), that enable the receiver of a proffered certificate to verify that the sender of the certificate is trustworthy. The chain 400 or path begins with an end entity certificate 402, and each certificate in the chain is signed by the entity identified by the next certificate in the chain. For example, the end entity certificate 402 (which comprises for example the owner's name, owners public key, and the hierarchically superior entity's name) is signed by the public key of the intermediate certificate 404. Similarly, the intermediate certificate 404 is signed by the public key of the root CA. Although the and entity's certificate 402 has not been signed by a root CA, it has been signed by the intermediate CA, and since the intermediate CA's certificate has been signed by a root CA, the end entity certificate 402 can be trusted to certify the identity of the possessor of that certificate because a chain of trust that has been established by validating each component of hardware and software from the end entity up to the root certificate. Of course, there can be any number of intermediate certificates 404.

Figure 4B:
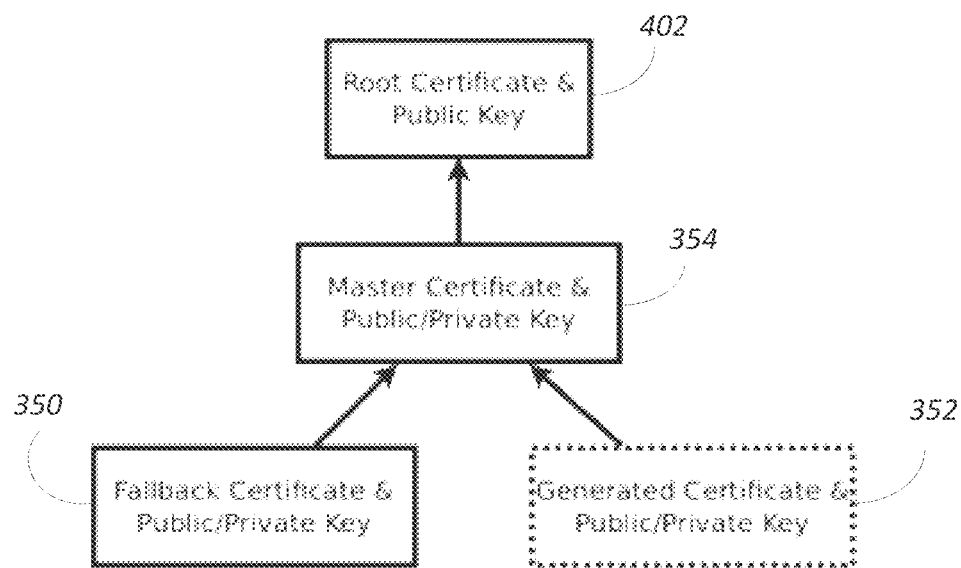
FIG. 4B is a diagram illustrating a certificate tree showing an application of certificate chains to the certificates used to authenticate the client device.

FIG. 4B is a diagram illustrating a certificate tree showing an application of certificate chains to the certificates used to authenticate the client device 106, as described above the. In this case, the fallback certificate 350 is signed by the public key of the master certificate 354, and the master certificate 354 is signed by the public key of the root certificate 402, thus creating a chain of trust from the fallback certificate 350 to the root certificate 402, which is a root of trust. This route of trust can be implemented by the MSO 102 the central server 118 or by the client device provider 114. Similarly, after new certificates 352 are generated, they are also signed with the public key of the master certificate 354 which again is signed by the public key of the root certificate 402. There could be more than one certificate & public key in the chain between the fallback certificate and generated certificate and the root certificate, only a single certificate is shown In FIG. 4B for simplicity. The server will contain the chain of certificates from the root to the master, the master certificate is used to validate either the fallback or generated certificate.

Hardware Environment

Figure 5:
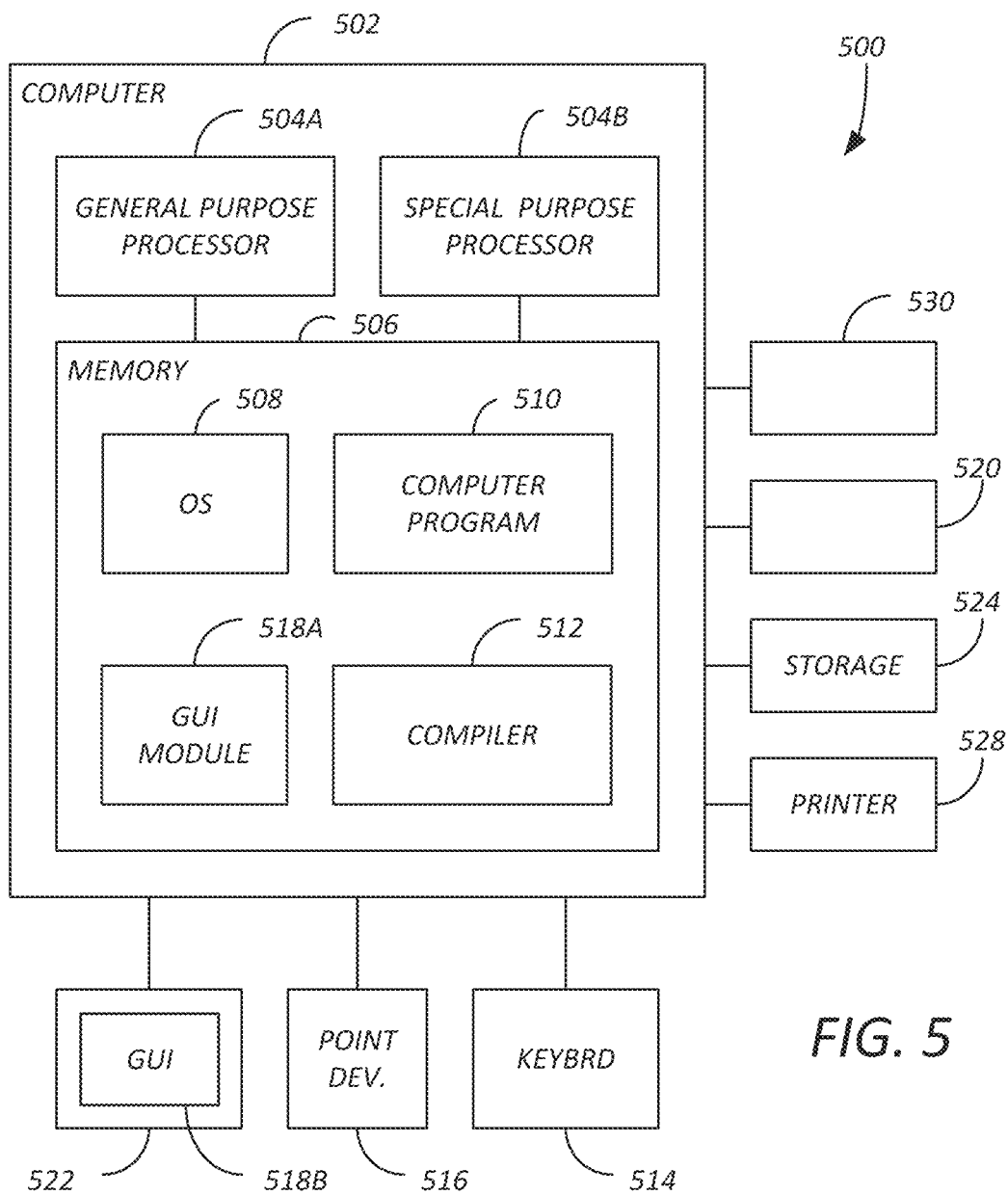
FIG. 5 illustrates an exemplary system that could be used to implement processing elements of the above disclosure.

FIG. 5 illustrates an exemplary system 500 that could be used to implement processing elements of the above disclosure, including the MSO 102, the central server 118, the CLIENT DEVICE 106, as well as the root certificate authority and the intermediate certificate authorities. The computer 502 comprises a processor 504 such as general purpose processor 504A and/or special purpose processor 504B and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an apparatus, method and system for providing secure communication between a client device having a non-volatile read only memory and a first server, including: determining if a generation of a certificate is complete, the certificate generated in the client device and having a public key generated from a private key; and providing the generated certificate to the first server to authenticate the client device if the generation of the certificate is complete; and retrieving a fallback certificate from the non-volatile read only memory and providing the fallback certificate to the first server to ephemerally authenticate the client device until the generated certificate is provided to the first server if the generation of the certificate is not complete.

Implementations may include one or more of the following features:

Any of the methods described above, wherein the fallback certificate digitally signed according to a master certificate Any of the methods described above, the master certificate is stored in the non-volatile read only memory of the client device, and the client device signs the fallback certificate with the master certificate.

Any of the methods described above, wherein the master certificate is signed according to a root certificate Any of the methods described above, wherein a certificate authority signs the master certificate with the root certificate.

Any of the methods described above, wherein the generation of the certificate is commenced after providing the fallback certificate to the first server.

Any of the methods described above, wherein the generation of the certificate is commenced after expiry of a temporally immediately preceding generated certificate and during a processing lull of the client device.

Any of the methods described above, wherein the generation of the certificate is commenced before expiry of a temporally immediately preceding generated certificate.

Any of the methods described above, wherein the first server is a conditional access system (CAS) server.

Another embodiment is evidenced by an apparatus for providing secure communication between a client device having a non-volatile read only memory and a first server, including: a processor, and a second memory. The second memory is communicatively coupled to the processor and stores processor instructions including processor instructions for determining if a generation of a certificate is complete, the certificate generated in the client device and having a public key generated from a private key, providing the generated certificate to the first server to authenticate the client device if the generation of the certificate is complete, and retrieving a fallback certificate from the non-volatile read only memory and providing the fallback certificate to the first server to ephemerally authenticate the client device until the generated certificate is provided to the first server if the generation of the certificate is not complete. Other embodiments are evidenced by the instructions for performing the operations in the combinations described above.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing secure communication between a client device having a non-volatile read only memory and a first server, comprising:
   determining if a generation of a certificate is complete, the certificate generated in the client device and having a public key generated from a private key; and
   providing the generated certificate to the first server to authenticate the client device if the generation of the certificate is complete; and
   retrieving a fallback certificate from the non-volatile read only memory and providing the fallback certificate to the first server to ephemerally authenticate the client device until the generated certificate is provided to the first server if the generation of the certificate is not complete.

2. The method of claim 1, wherein the fallback certificate digitally signed according to a master certificate.

3. The method of claim 2, wherein the master certificate is stored in the non-volatile read only memory of the client device, and the client device signs the fallback certificate with the master certificate.

4. The method of claim 3, wherein the master certificate is signed according to a root certificate.

5. The method of claim 4, wherein a certificate authority signs the master certificate with the root certificate.

6. The method of claim 1, wherein the generation of the certificate is commenced after providing the fallback certificate to the first server.

7. The method of claim 1, wherein the generation of the certificate is commenced after expiry of a temporally immediately preceding generated certificate and during a processing lull of the client device.

8. The method of claim 1, wherein the generation of the certificate is commenced before expiry of a temporally immediately preceding generated certificate.

9. The method of claim 1, wherein the first server is a conditional access system (CAS) server.

10. An apparatus for providing secure communication between a client device having a non-volatile read only memory and a first server, comprising:
 a processor; and
 a second memory, the second memory communicatively coupled to the processor, the second memory storing processor instructions including processor instructions for:
 determining if a generation of a certificate is complete, the certificate generated in the client device and having a public key generated from a private key;
 providing the generated certificate to the first server to authenticate the client device if the generation of the certificate is complete; and
 retrieving a fallback certificate from the non-volatile read only memory and providing the fallback certificate to the first server to ephemerally authenticate the client device until the generated certificate is provided to the first server if the generation of the certificate is not complete.

11. The apparatus of claim 10, wherein the fallback certificate digitally signed according to a master certificate.

12. The apparatus of claim 11, wherein the master certificate is stored in the non-volatile read only memory of the client device, and the client device signs the fallback certificate with the master certificate.

13. The apparatus of claim 12, wherein the master certificate is signed according to a root certificate.

14. The apparatus of claim 13, wherein a certificate authority signs the master certificate with the root certificate.

15. The apparatus of claim 10, wherein the generation of the certificate is commenced after providing the fallback certificate to the first server.

16. The apparatus of claim 10, wherein the generation of the certificate is commenced after expiry of a temporally immediately preceding generated certificate and during a processing lull of the client device.

17. The apparatus of claim 10, wherein the generation of the certificate is commenced before expiry of a temporally immediately preceding generated certificate.

18. The apparatus of claim 10, wherein the first server is a conditional access system (CAS) server.

19. An apparatus for providing secure communication between a client device having a non-volatile read only memory and a first server, comprising:
 means for determining if a generation of a certificate is complete, the certificate generated in the client device and having a public key generated from a private key; and
 means for providing the generated certificate to the first server to authenticate the client device if the generation of the certificate is complete; and
 means for retrieving a fallback certificate from the non-volatile read only memory and providing the fallback certificate to the first server to ephemerally authenticate the client device until the generated certificate is provided to the first server if the generation of the certificate is not complete.

20. The apparatus of claim 19, wherein the fallback certificate digitally signed according to a master certificate.

* * * * *